United States Patent [19]

McKenna

[11] Patent Number: 5,712,618
[45] Date of Patent: Jan. 27, 1998

[54] METHOD AND APPARATUS FOR AN AUTOMATIC SIGNALING DEVICE

[76] Inventor: Michael R. McKenna, 1122 W. Morse Ave., Chicago, Ill. 60626

[21] Appl. No.: 520,537

[22] Filed: Aug. 29, 1995

[51] Int. Cl.$^6$ .................................................. B60Q 1/34
[52] U.S. Cl. ...................... 340/475; 340/463; 340/465; 340/468; 364/424.01; 364/424.05; 364/426.02; 362/80
[58] Field of Search ........................... 340/463, 465, 340/468, 436, 671, 475; 364/424.01, 426.02, 424.05; 362/80, 36

[56] References Cited

U.S. PATENT DOCUMENTS

| | | | |
|---|---|---|---|
| 3,784,974 | 1/1974 | Hamashige | 340/465 |
| 3,895,683 | 7/1975 | Lang et al. | 180/103 |
| 4,123,116 | 10/1978 | Holtzman et al. | 340/73 |
| 4,942,529 | 7/1990 | Avitan et al. | 364/424.01 |
| 4,996,657 | 2/1991 | Shiraishi et al. | 364/424.05 |
| 5,079,708 | 1/1992 | Brown | 364/424.05 |
| 5,335,176 | 8/1994 | Nakamura | 364/424.05 |
| 5,345,385 | 9/1994 | Zomotor et al. | 364/424.05 |
| 5,428,512 | 6/1995 | Mouzas | 362/80 |
| 5,467,072 | 11/1995 | Michael | 340/436 |

*Primary Examiner*—Jeffery Hofsass
*Assistant Examiner*—Timothy Edwards, Jr.
*Attorney, Agent, or Firm*—Michael R. McKenna

[57] ABSTRACT

An automatic signaling device for a vehicle which automatically initiates a warning signal to pedestrians and to other vehicles in connection with lane changes and upon turns. The present invention is activated and de-activated automatically providing significant safety advantages for all of those using the roads and highways.

15 Claims, 2 Drawing Sheets

METHOD AND APPARATUS FOR AN AUTOMATIC SIGNALING DEVICE

TECHNICAL FIELD

This invention relates to methods and apparatuses for an automatic signaling device for a vehicle that automatically activates a warning signal to pedestrians and to other vehicles. The present invention is actuated and de-activated automatically providing a significant safety device for all of those using the roads and highways.

BACKGROUND OF THE INVENTION

The invention disclosed herein relates to preferred methods and apparatuses for an automatic signaling device which automatically activates a warning signal. The following patents form a background for the instant invention. None of the cited publications is believed to detract from the patentability of the claimed invention.

U.S. Pat. No. 3,771,096 issued to Walter on Nov. 6, 1973, discloses a lane changing signaling device for vehicles employing a rotary electrical connector joined to the steering wheel. The principal disadvantage of the device is that it fails to measure the angle of rotation of the steering wheel.

A vehicle turn detection apparatus is disclosed in U.S. Pat. No. 4,213,116 issued to Holtzman et al. on Jul. 15, 1980, which discloses a sensor—a linear motion accelerometer—mounted laterally to detect lateral movement of a motorcycle to either side of a straight path to control the reset function of a manually actuated directional signal. The sensors disclosed are a pair of mercury switches adapted to be activated upon the lateral movement of the motorcycle to which they are attached. The reference in the specification to acceleration is merely the use of lateral force to propel the mercury laterally to effectuate contact closure. There is no teaching of a means for determining a magnitude of lateral vehicular changes. Unlike embodiments of the instant invention, the Holtzman et al. apparatus operates independent of time and distance travelled by the vehicle (Column 2, lines 52–54). Another disadvantage of the foregoing devise is that it resets a previous manually initiated signal switch. Moreover, lateral movement is not measured but merely detected.

A system and method for detecting driver drowsiness including detection of steering rotation and reversal is disclosed in U.S. Pat. No. 4,604,611 issued to Seko et.al. on Aug. 5, 1986. Changes in steering direction are monitored—a pulse is produced when the steering wheel is rotated through a specified number of degrees—producing a pattern of steering pulses and steering reversals to predict driver drowsiness. The pulse produced as the steering wheel is rotated through the specified number of degrees indicates a direction of change. A vehicle speed sensor is provided but is used only to establish time references (see Column 3, line 24 to Column 4, line 3) for the analysis of a pulse pattern. There is no teaching of a function for computing wheel angle to determine a magnitude of lateral vehicular changes. Another disadvantage of the Seko et.al. device is that it fails to measure cumulative changes, it is limited to detecting discrete changes which are matched to defined patterns to predict drowsiness.

U.S. Pat. No. 4,638,295 issued to Middlebrook et.al. on Jan. 20, 1987, reveals a vehicular movement indicator system consisting of both motion and steering status sensors. According to the disclosure, after the turn signal lamps are manually initiated causing the vehicle's signal lamps to flash at the rate of 80 flashes per minute, the flash rate is changed to 200 flashes per minute when a front wheel turn sensor detects that the front wheel is turned (angle of the turn is irrelevant) and a motor vehicle motion sensor detects that the vehicle is moving (actual speed is irrelevant).

Middlebrook et.al. does not self actuate when the vehicle is in the stationary position. And, unlike the current invention, there is no means to functionally correlate speed and angle of turn for determining an interval of lateral movement. The Middlebrook et.al. system is dependent upon the vehicle driver having first activated the normal signal system where the invention disclosed changes the flash rate of a previously activated signal from 80 to 200 flashes per minute when the vehicle begins to move while the front wheel is turned. (Column 3, line 48–51).

U.S. Pat. Nos. 2,226,140, 2,175,848, 2,111,931, and 2,432,388 issued to Hriner, Metcalf, Howard, and Curtis, respectively, are of general interest in that they reveal basic vehicle direction signaling apparatuses.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach structures that detect forward movement of the vehicle and rotational movement of the steering wheel, none of the foregoing devices teach a means for determining a vehicle's interval of lateral movement, lateral velocity or lateral acceleration based on a detected vehicular interval of movement, computed lateral speed and/or computed lateral acceleration, and turnable wheel angle (taken from a sensor that may be associated with a steering wheel, a turnable wheel of the vehicle (generally the front wheel), or a related system). Nor does the prior art teach a means to initiate signaling based on a hard turned wheel (near full turn exceeding a specified threshold) while the vehicle is stationary. This advantage is useful for a stationary vehicle positioned on the side of a roadway or in a parallel parking space that is poised to enter traffic lanes. Signaling will be initiated when the wheel is hard turned even though the vehicle has not yet moved.

In brief, this important invention provides a means of determining a turnable wheel angle to ascertain an interval of lateral movement, lateral velocity, and/or lateral acceleration to automatically initiate vehicle signaling for vehicle turns and lane changes. It is the rate of change in lateral movement that yields lateral velocity, and similarly, the rate of change of lateral velocity that yields lateral acceleration, which changes initiate the signaling function. These advantages are neither suggested nor taught by the foregoing patents.

Still other advantages will be apparent from the disclosure that follows.

SUMMARY OF THE INVENTION

The invention relates to methods and apparatuses for an automatic signaling device for a vehicle, such as a car or a truck, which automatically initiates a warning signal to pedestrians and to other vehicles. The present invention discloses an automatic signaling device comprising a means for determining an interval of lateral movement of the vehicle operably connected to a means for signaling. The means for signaling may be integral with the device, an existing turn signal indicator provided as standard equipment on a roadworthy vehicle, or a specially designed signal system, among others that will be readily appreciated by one skilled in the art.

In a preferred embodiment of the automatic signaling device of the present invention the means for determining an interval of lateral movement comprises a means for determining a turnable wheel angle β, defined by an angle between a longitudinal centerline of the vehicle to which a turnable wheel is attached and the turnable wheel (sensors may be operatively connected to the turnable wheel, a steering wheel or related systems); a means for ascertaining the forward speed V of the vehicle; a means for evaluating an interval of lateral movement D of the vehicle over a period of time T operably connected to the means for determining a turnable wheel angle β and the means for ascertaining the forward speed V of the vehicle. Additionally, the automatic signaling device may include a means for determining an instantaneous lateral velocity of the vehicle and/or a means for determining an instantaneous lateral acceleration of the vehicle, each operably connected to the means for signaling.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Preferred embodiments of the invention are described hereinafter with reference to the accompanying drawing wherein.

DETAILED DESCRIPTION OF THE INVENTION

Figure 1:
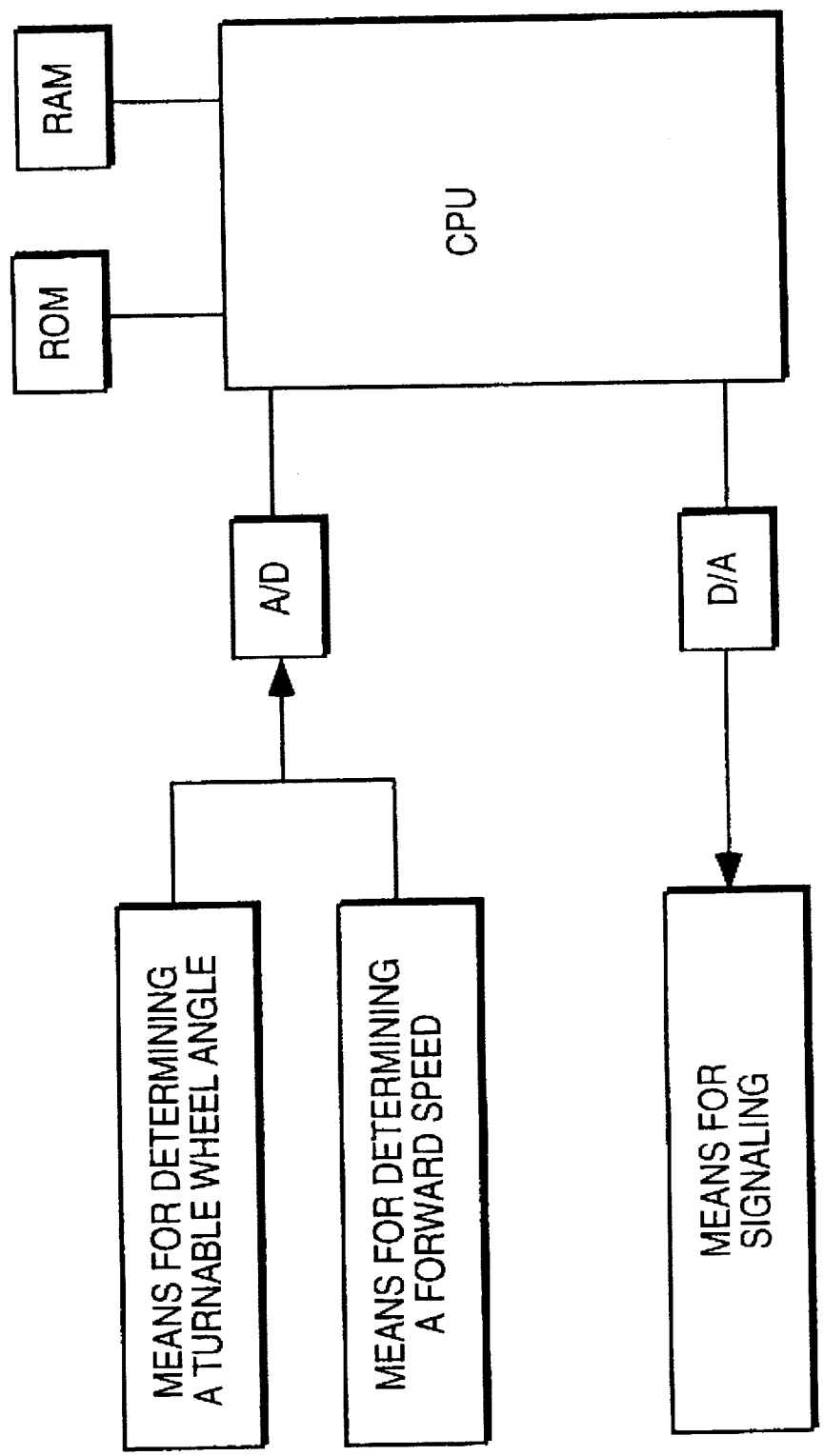
FIG. 1 is a block diagram of a preferred embodiment of the electrically actuated components of the automatic signaling device of the present invention.

The preferred embodiments depicted in the drawing include a relatively simple device which utilizes a digital computer to receive vehicle information including a turnable wheel angle, which may be read from a turnable wheel (normally the front wheel of a vehicle, although adapting the device to all-wheel turning vehicles and rear wheel turning vehicles will be understood by one skilled in the art), the steering mechanism and related systems, and the forward speed of the vehicle, including standard, augmented and independent speed monitoring systems.

Figure 2:
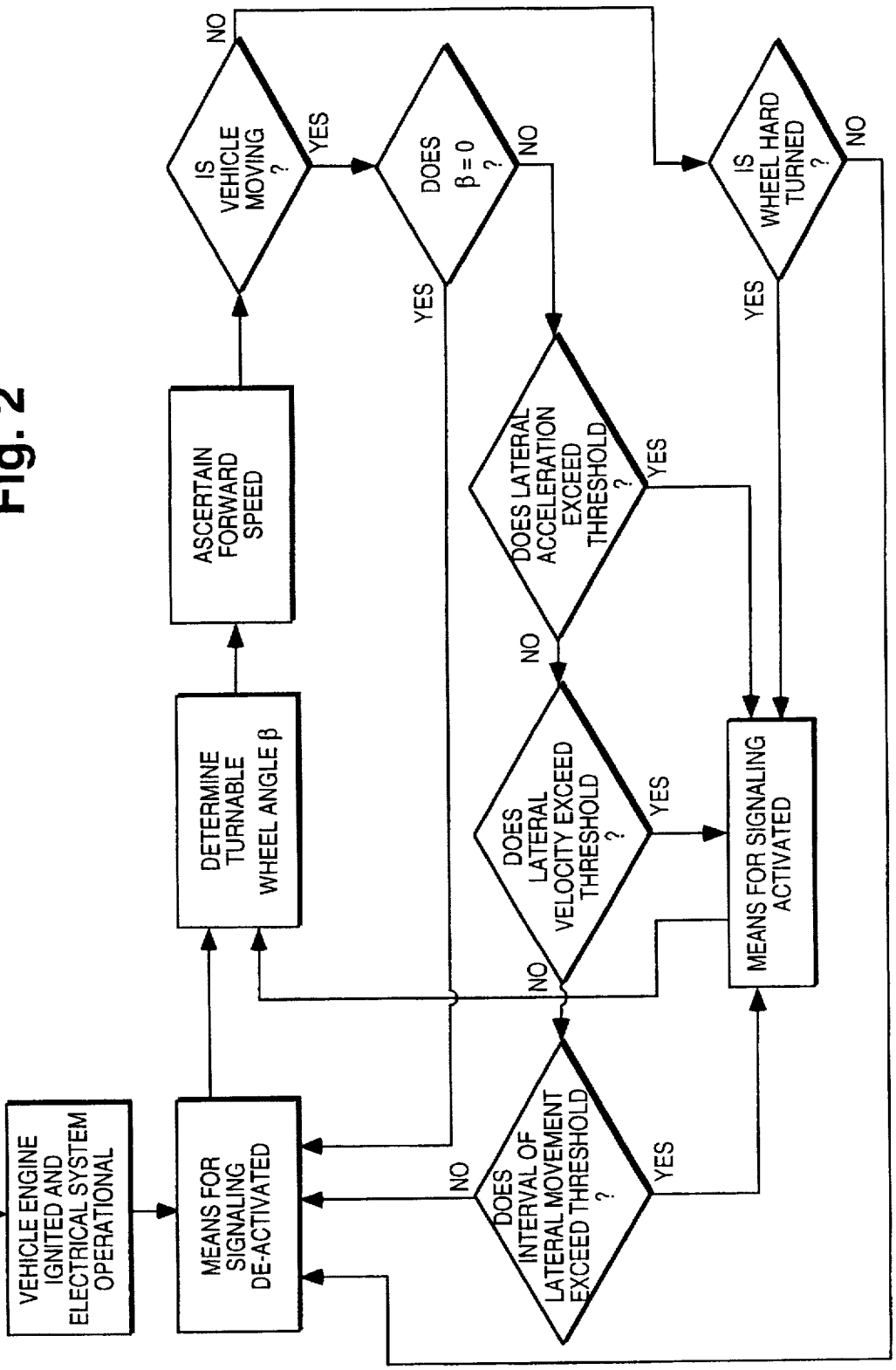
FIG. 2 is a flow diagram of a preferred embodiment of the operation of the automatic signaling device of the present invention.

Such input data, if analog in form, may be digitalized and processed by a computer, which analyzes the input data to determine an interval of lateral movement of the vehicle, an instantaneous lateral velocity of the vehicle, and/or an instantaneous lateral acceleration of the vehicle. Each determined characteristic can be compared with predetermined threshold values stored in the memory of the computer. When a determined characteristic, or combination thereof, exceed a preset threshold value, an output signal can be generated to actuate the means for signaling. FIG. 2 is a flow diagram of a preferred embodiment showing the operation of the automatic signaling device of the present invention.

Moreover, a preferred embodiment of the automatic signaling device of the present invention provides a means to de-activate and reset the means for activating the means for signaling when the turnable wheel angle β approaches zero degrees.

The various preferred embodiment of the automatic signaling device of this important invention may employ any or all of the determined characteristics to trigger a warning signal.

FIG. 1 shows a block diagram of a preferred embodiment of the electrically actuated components of the automatic signaling device of the present invention.

The discussion that follows, without limiting the scope of the invention, will refer to the invention as depicted in the drawing.

A preferred embodiment of the automatic signaling device of the present invention discloses a means for determining an interval of lateral movement which comprises a means for determining a turnable wheel angle β, defined by an angle between a longitudinal centerline of the vehicle to which a turnable wheel is attached and the turnable wheel (sensors may be operatively connected to the turnable wheel, a steering wheel or related systems); a means for ascertaining the forward speed V of the vehicle; a means for evaluating an interval of lateral movement D of the vehicle over a period of time T operably connected to the means for determining a turnable wheel angle β and the means for ascertaining the forward speed V of the vehicle. (The period of time T may begin when the vehicle is in motion and β is greater or less than zero degrees.). Thus, the interval of lateral movement D of the vehicle may be approximated by a trigonometric equation $$D = VT \sin \beta; \text{ and}$$

a means for activating a means of signaling, which is operably connected to the means for evaluating an interval of lateral movement D of the vehicle, when the interval of lateral movement D exceeds a minimum threshold, indicating that the vehicle is moving laterally warranting a signal. The means for signaling may be the vehicles standard turn indicator, an augmented system or an independent signaling means.

The augmented system or the independent signaling means may include duplicative turn/warning signals and may also incorporate warning lights disposed on the lateral sides of the vehicle which may be readily seen by vehicles positioned laterally adjacent to the subject vehicle. Such lateral side warning lights are particularly helpful when a vehicle is unintentionally drifting from one lane of a road or highway into another. A second vehicle traveling in an adjacent lane next to the drifting vehicle, will be automatically warned of the inadvertent movement and be better able to avoid a collision.

Without further elaboration, it will be readily understood that the means for signaling will have a right side component and a left side component, each respectively activated in response to a turnable wheel angle β which is greater than or less than zero degrees (i.e. wheel angles less than zero are indicative of movement to the left and wheel angles greater than zero are indicative of movement to the right, triggering activation of the "left signal(s)" or the "right signal(s)", respectively.

A preferred embodiment of the automatic signaling device of the present invention may be used with a vehicle having a means for signaling and a means for ascertaining the forward speed V of the vehicle or with a vehicle having a means for signaling, a means for determining a turnable wheel angle β and a means for ascertaining the forward speed V of the vehicle.

The means for determining an instantaneous lateral velocity of a preferred embodiment of the automatic signaling device of the present invention utilizes a computer to process a signal monitoring an instantaneous turnable wheel angle $\beta_n$, defined by the angle between a longitudinal centerline of the vehicle to which a turnable wheel is attached and the turnable wheel at time $T_n$, and a signal monitoring an instantaneous forward speed $V_n$ of the vehicle at time $T_n$. The computer evaluates the inputs and determines an instantaneous lateral velocity $L_n$ of the vehicle at time $T_n$. The computer may be programmed to determine an instantaneous lateral velocity $L_n$ of the vehicle using a trigonometric equation $$L_n = dD_n/dT = V_n \sin \beta_n.$$

When an instantaneous lateral velocity $L_n$ exceeds a minimum predetermined threshold value stored in the memory of the computer, indicating that the vehicle is moving laterally at a rate which warrants a signal, a means for activating a means for signaling, which is operably connected to the computer, will activate the means for signaling.

Moreover, a preferred embodiment of the automatic signaling device of the present invention teaches a means for determining an instantaneous lateral acceleration $A_n$ at time $T_n$ which comprises a means for determining an instantaneous turnable wheel angle $\beta_n$, defined by the angle between a longitudinal centerline of the vehicle to which a turnable wheel is attached and the turnable wheel at time $T_n$, a means for ascertaining an instantaneous forward speed $V_n$ of the vehicle at time $T_n$, a means for evaluating an instantaneous lateral acceleration $A_n$ of the vehicle at time $T_n$ operably connected to the means for determining an instantaneous turnable wheel angle $\beta_n$ and the means for ascertaining an instantaneous forward speed $V_n$ of the vehicle. The instantaneous lateral acceleration $A_n$ of the vehicle may be approximated by a trigonometric equation $$A_n = d(V_n \sin \beta_n)/dT.$$

The computer can generate an activation signal to the means for signaling, when an instantaneous lateral acceleration $A_n$ exceeds a minimum threshold, indicating that the vehicle is accelerating laterally at a rate which warrants a signal.

In combination with a vehicle having a means for signaling another preferred embodiment of the automatic signaling device of the present invention is disclosed having a means for determining an interval of lateral movement of the vehicle is operably connected to the means for signaling.

In combination with a vehicle having a means for signaling another preferred embodiment of the automatic signaling device of the present invention is disclosed having a means for determining an instantaneous lateral velocity of the vehicle operably connected to the means for signaling.

In combination with a vehicle having a means for signaling another preferred embodiment of the automatic signaling device of the present invention is disclosed having a means for determining an instantaneous lateral acceleration of the vehicle operably connected to the means for signaling.

The foregoing may be combined to include in combination with a vehicle having a means for signaling, preferred embodiments of the automatic signaling device of the present invention having a means for determining an interval of lateral movement of the vehicle is operably connected to the means for signaling, a means for determining an instantaneous lateral velocity of the vehicle operably connected to the means for signaling, and/or a means for determining an instantaneous lateral acceleration of the vehicle operably connected to the means for signaling.

It will be readily understood by those skilled in the art that the means for signaling, the means for determining a turnable wheel angle, the means for determining a forward speed of the vehicle, and/or a computer means suitable to analyze a signal from these means may be made part of and integrated into the vehicle.

For example, and not by way of limitation, a preferred embodiment of the automatic signaling device of the present invention may be used with a vehicle having a means for signaling and a means for ascertaining an instantaneous forward speed $V_n$ of the vehicle at time $T_n$, having a means for determining an instantaneous lateral acceleration $A_n$ at time $T_n$ which comprises a means for determining an instantaneous turnable wheel angle $\beta_n$, defined by the angle between a longitudinal centerline of the vehicle to which a turnable wheel is attached and the turnable wheel at time $T_n$, a means for evaluating an instantaneous lateral velocity $L_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $A_n = d(V_n \sin \beta_n)/dT$, and a means for activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

Another example of a preferred embodiment of the automatic signaling device of the present invention, for use with a vehicle having a means for signaling, a means for determining an instantaneous turnable wheel angle $\beta_n$, defined by the angle between a longitudinal centerline of the vehicle to which a turnable wheel is attached and the turnable wheel at time $T_n$, and a means for ascertaining an instantaneous forward speed $V_n$ of the vehicle at time $T_n$, said automatic signaling device having a means for determining an instantaneous lateral acceleration $A_n$ at time $T_n$ which comprises a means for evaluating an instantaneous acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $A_n = dL_n/dT = d(V_n \sin \beta_n)/dT$, and a means for activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

Another preferred embodiment of the automatic signaling device of the present invention comprises a means for determining a turnable wheel angle β, defined by the angle between a longitudinal centerline of the vehicle to which a turnable wheel is attached and the turnable wheel and a means for activating a means of signaling, which is operably connected to the means for determining a turnable wheel angle β, when the turnable wheel angle β exceeds a minimum threshold, indicating that the vehicle has the capacity to significantly move laterally warranting a signal.

In a preferred embodiment of the automatic signaling device of the present invention the means for activating the signal indicator occurs when an instantaneous lateral component (dD/dT+f($A_n$)) exceeds a minimum threshold, indicating that the vehicle will be moving laterally at a rate which warrants a signal.

A method for automatically signaling which comprises determining a turnable wheel angle β, defined by the angle between a longitudinal centerline of the vehicle to which a turnable wheel is attached and the turnable wheel, ascertaining the forward speed V of the vehicle, evaluating an interval of lateral movement D of the vehicle over a period of time T operably connected to the means for determining a turnable wheel angle β and the means for ascertaining the forward speed V of the vehicle, whereby, the interval of lateral movement D of the vehicle is approximated by a trigonometric equation D=VT sin β, and activating a means of signaling, which is operably connected to the means for evaluating an interval of lateral movement D of the vehicle.

The foregoing method for automatically signaling may further comprise activating the means of signaling when the interval of lateral movement D exceeds a minimum threshold, indicating that the vehicle is moving laterally warranting a signal. Additionally, the foregoing method for automatically signaling may further comprise activating the means of signaling when the lateral velocity D/T exceeds a minimum threshold, indicating that the vehicle is moving laterally at a rate warranting a signal.

Another preferred embodiment of the method for automatically signaling of the present invention comprises determining an instantaneous turnable wheel angle $β_n$, defined by the angle between a longitudinal centerline of the vehicle to which a turnable wheel is attached and the turnable wheel at time $T_n$, ascertaining an instantaneous forward speed $V_n$ of the vehicle at time $T_n$, evaluating an instantaneous lateral velocity $L_n$ of the vehicle at time $T_n$ operably connected to the means for determining an instantaneous turnable wheel angle $β_n$ and the means for ascertaining an instantaneous forward speed $V_n$ of the vehicle, whereby the instantaneous lateral velocity $L_n$ of the vehicle is approximated by a trigonometric equation $L_n$ =dD/dT=$V_n$ sin βn, and activating the means for signaling, which is operably connected to the means for evaluating a lateral velocity $L_n$ of the vehicle, when the instantaneous lateral velocity $L_n$ exceeds a minimum threshold, indicating that the vehicle is moving laterally at a rate which warrants a signal.

Another method for automatically signaling comprises determining an instantaneous turnable wheel angle $β_n$, defined by the angle between a longitudinal centerline of the vehicle to which a turnable wheel is attached and the turnable wheel at time $T_n$, ascertaining an instantaneous forward speed $V_n$ of the vehicle at time $T_n$, evaluating an instantaneous lateral acceleration $A_n$ of the vehicle at time $T_n$ operably connected to the means for determining an instantaneous turnable wheel angle $β_n$ and the means for ascertaining an instantaneous forward speed $V_n$ of the vehicle, whereby the instantaneous lateral acceleration $A_n$ of the vehicle is approximated by a trigonometric equation $A_n$=d($V_n$ sin $β_n$)/dT, and activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

Reference should be made to FIG. 2 of the drawing which shows a preferred embodiment of a flow diagram of a method of operation.

Another preferred method for automatically signaling which comprises determining a turnable wheel angle β, defined by the angle between a longitudinal centerline of the vehicle to which a turnable wheel is attached and the turnable wheel and activating a means of signaling, which is operably connected to the means for determining a turnable wheel angle β, when the turnable wheel angle β exceeds a minimum threshold, indicating that the vehicle has the capacity to significantly move laterally warranting a signal.

In yet another preferred method for automatically signaling which comprises ascertaining an instantaneous forward speed $V_n$ of the vehicle at time $T_n$, determining an instantaneous turnable wheel angle $β_n$, defined by the angle between a longitudinal centerline of the vehicle to which a turnable wheel is attached and the turnable wheel at time $T_n$, activating a means of signaling, which is operably connected to the means for determining a turnable wheel angle $β_n$, when the turnable wheel angle $β_n$ exceeds a minimum threshold, indicating that the vehicle has the capacity to significantly move laterally warranting a signal, evaluating an instantaneous lateral acceleration $A_n$ of the vehicle at time $T_n$ operably connected to the means for determining an instantaneous turnable wheel angle $β_n$ and the means for ascertaining an instantaneous forward speed $V_n$ of the vehicle, whereby the instantaneous lateral acceleration $A_n$ of the vehicle is approximated by a trigonometric equation $A_n$=d($V_n$ sin $β_n$)/dT, activating the means for signaling, which is operably connected to the means for evaluating a lateral acceleration $A_n$ of the vehicle, after determining that the instantaneous lateral acceleration $A_n$ exceeds a minimum threshold, indicating that the vehicle is accelerating laterally at a rate which warrants a signal, evaluating an instantaneous lateral velocity $L_n$ of the vehicle at time $T_n$ operably connected to the means for determining an instantaneous turnable wheel angle $β_n$ and the means for ascertaining an instantaneous forward speed $V_n$ of the vehicle, whereby the instantaneous lateral velocity $L_n$ of the vehicle is approximated by a trigonometric equation $L_n$=d$D_n$/dT=$V_n$ sin $β_n$, activating the means for signaling, which is operably connected to the means for evaluating a lateral velocity $L_n$ of the vehicle, after determining that the instantaneous lateral velocity $L_n$ exceeds a minimum threshold, indicating that the vehicle is moving laterally at a rate which warrants a signal, evaluating an interval of lateral movement $D_n$ of the vehicle over a period of time T operably connected to the means for determining an instantaneous turnable wheel angle $β_n$ and the means for ascertaining the instantaneous forward speed $V_n$ of the vehicle, whereby, the interval of lateral movement $D_n$ of the vehicle is approximated by a trigonometric equation $D_n$=∫V sin $B_n$ dT, and activating the means of signaling, which is operably connected to the means for evaluating an interval of lateral movement $D_n$ of the vehicle, after the interval of lateral movement $D_n$ exceeds a minimum threshold, indicating that the vehicle is moving laterally warranting a signal, and de-activating the means of signaling, when $β_n$ approaches zero degrees. Experimentation may show that $β_n$ should equal rather than merely approach zero degrees.

Another preferred embodiment of the automatic signaling device of the present invention, for use with a vehicle, comprises a means for signaling and a means for determining an interval of lateral movement of the vehicle operably connected to the means for signaling. Additionally, the foregoing automatic signaling device may further comprise a means for determining an instantaneous lateral velocity of the vehicle operably connected to the means for signaling. Furthermore, the foregoing automatic signaling device may further comprise a means for determining an instantaneous lateral acceleration of the vehicle operably connected to the means for signaling.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

Further, the purpose of the foregoing abstract is to enable the U.S. Patent and Trademark Office and the public generally, and especially the scientist, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automatic signaling device, for use in a vehicle having means for signaling, means for determining a turnable wheel angle $\beta$, defined by an angle between a longitudinal centerline of the vehicle to which a turnable wheel is attached and the turnable wheel, and means for ascertaining the forward speed V of the vehicle, comprising a means for determining movement of a lateral distance of the vehicle operably connected to the means for signaling, wherein the means for determining movement of a lateral distance comprises:

a. a means for evaluating movement of a lateral distance D of the vehicle over a period of time T operably connected to the means for determining a turnable wheel angle $\beta$ and the means for ascertaining the forward speed V of the vehicle, whereby the movement of a lateral distance D of the vehicle is approximated by a trigonometric equation $$D = VT \sin \beta; \text{ and}$$

b. a means for activating the means of signaling, which is operably connected to the means for evaluating movement of a lateral distance D of the vehicle, when the movement of a lateral distance D exceeds a minimum threshold, indicating that the vehicle is moving laterally warranting a signal.

2. The automatic signaling device of claim 1, further comprising a means for determining an instantaneous lateral velocity of the vehicle and a means for determining an instantaneous lateral acceleration of the vehicle operably connected to a means for signaling.

3. The automatic signaling device of claim 1, further comprising a means for determining an instantaneous lateral velocity of the vehicle operably connected to a means for signaling.

4. The automatic signaling device of claim 3 for use in a vehicle having a means for signaling, a means for determining an instantaneous turnable wheel angle $\beta_n$, defined by the angle between a longitudinal centerline of the vehicle to which a turnable wheel is attached and the turnable wheel at time $T_n$, and a means for ascertaining an instantaneous forward speed $V_n$ of the vehicle at time $T_n$, wherein the means for determining an instantaneous lateral velocity $L_n$ comprises:

a. a means for evaluating an instantaneous lateral velocity $L_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral velocity $L_n$ of the vehicle is approximated by a trigonometric equation $$L_n = dD/dT = V_n \sin \beta_n; \text{ and}$$

b. a means for activating the means for signaling, which is operably connected to the means for evaluating a lateral velocity $L_n$ of the vehicle, when an instantaneous lateral velocity $L_n$ exceeds a minimum threshold, indicating that the vehicle is moving laterally at a rate which warrants a signal.

5. The automatic signaling device of claim 3 wherein the means for determining an instantaneous lateral velocity comprises:

a. a means for determining an instantaneous turnable wheel angle $\beta_n$, defined by the angle between a longitudinal centerline of the vehicle to which a turnable wheel is attached and the turnable wheel at time $T_n$;

b. a means for ascertaining an instantaneous forward speed $V_n$ of the vehicle at time $T_n$;

c. a means for evaluating an instantaneous lateral velocity $L_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral velocity $L_n$ of the vehicle is approximated by a trigonometric equation $$L_n = dD/dT = V_n \sin \beta_n;$$

d. a means for signaling; and e. a means for activating the means for signaling, which is operably connected to the means for evaluating a lateral velocity $L_n$ of the vehicle, when an instantaneous lateral velocity $L_n$ exceeds a minimum threshold, indicating that the vehicle is moving laterally at a rate which warrants a signal.

6. The automatic signaling device of claim 1, further comprising a means for determining an instantaneous lateral acceleration of the vehicle operably connected to a means for signaling.

7. The automatic signaling device of claim 6 wherein the means for determining an instantaneous lateral acceleration $A_n$ at time $T_n$ which comprises:

a. a means for determining an instantaneous turnable wheel angle $\beta_n$, defined by the angle between a longitudinal centerline of the vehicle to which a turnable wheel is attached and the turnable wheel at time $T_n$;

b. a means for ascertaining an instantaneous forward speed $V_n$ of the vehicle at time $T_n$;

c. a means for evaluating an instantaneous lateral acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $$A_n = d(V_n \sin \beta_n)/dT;$$

d. a means for signaling; and e. a means for activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

8. The automatic signaling device of claim 6, for use in a vehicle having a means for ascertaining an instantaneous forward speed $V_n$ of the vehicle at time $T_n$, wherein the means for determining an instantaneous lateral acceleration $A_n$ at time $T_n$ comprises:

a. a means for determining an instantaneous turnable wheel angle $\beta_n$, defined by the angle between a longitudinal centerline of the vehicle to which a turnable wheel is attached and the turnable wheel at time $T_n$;

b. a means for evaluating an instantaneous acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $$A_n = d(V_n \sin \beta_n)/dT; \text{ and}$$

c. a means for activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

9. An automatic signaling device, for use in a vehicle having a means for signaling, a means for determining an instantaneous turnable wheel angle $\beta_n$, defined by the angle between a longitudinal centerline of the vehicle to which a turnable wheel is attached and the turnable wheel at time $T_n$, and a means for ascertaining an instantaneous forward speed $V_n$ of the vehicle at time $T_n$, said automatic signaling device having a means for determining an instantaneous lateral acceleration $A_n$ at time $T_n$ which comprises:

a. a means for evaluating an instantaneous acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $$A_n = dL_n/dT = d(V_n \sin \beta_n)/dT; \text{ and}$$

b. a means for activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

10. A method for automatically signaling for use in a vehicle which comprises:

a. determining a turnable wheel angle $\beta$, defined by the angle between a longitudinal centerline of the vehicle to which a turnable wheel is attached and the turnable wheel;

b. ascertaining the forward speed $V$ of the vehicle;

c. evaluating movement of a lateral distance D of the vehicle over a period of time T operably connected to the means for determining a turnable wheel angle $\beta$ and the means for ascertaining the forward speed V of the vehicle, whereby, the movement of a lateral distance D of the vehicle is approximated by a trigonometric equation $$D = VT \sin \beta; \text{ and}$$

d. activating a means of signaling, which is operably connected to the means for evaluating movement of a lateral distance D of the vehicle.

11. The method for automatically signaling of claim 10 further comprising activating the means of signaling when the movement of a lateral distance D exceeds a minimum threshold, indicating that the vehicle is moving laterally warranting a signal.

12. The method for automatically signaling of claim 10 further comprising activating the means of signaling when the lateral velocity D/T exceeds a minimum threshold, indicating that the vehicle is moving laterally at a rate warranting a signal.

13. A method for automatically signaling for use in a vehicle which comprises:

a. determining an instantaneous turnable wheel angle $\beta_n$, defined by the angle between a longitudinal centerline of the vehicle to which a turnable wheel is attached and the turnable wheel at time $T_n$;

b. ascertaining an instantaneous forward speed $V_n$ of the vehicle at time $T_n$;

c. evaluating an instantaneous lateral velocity $L_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral velocity $L_n$ of the vehicle is approximated by a trigonometric equation $$L_n = dD_n/dT = V_n \sin \beta_n; \text{ and}$$

d. activating the means for signaling, which is operably connected to the means for evaluating a lateral velocity $L_n$ of the vehicle, when the instantaneous lateral velocity $L_n$ exceeds a minimum threshold, indicating that the vehicle is moving laterally at a rate which warrants a signal.

14. A method for automatically signaling for use in a vehicle which comprises:

a. determining an instantaneous turnable wheel angle $\beta_n$, defined by the angle between a longitudinal centerline of the vehicle to which a turnable wheel is attached and the turnable wheel at time $T_n$;

b. ascertaining an instantaneous forward speed $V_n$ of the vehicle at time $T_n$;

c. evaluating an instantaneous lateral acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $$A_n = d(V_n \sin \beta_n)/dT; \text{ and}$$

d. activating the means for signaling, which is operably connected to the means for evaluating a lateral acceleration $A_n$ of the vehicle, when an instantaneous lateral acceleration $A_n$ exceeds a minimum threshold, indicating that the vehicle is accelerating laterally at a rate which warrants a signal.

15. A method for automatically signaling which comprises:

a. ascertaining an instantaneous forward speed $V_n$ of the vehicle at time $T_n$;

b. determining an instantaneous turnable wheel angle $\beta_n$, defined by the angle between a longitudinal centerline of the vehicle to which a turnable wheel is attached and the turnable wheel at time $T_n$;

c. activating a means of signaling, which is operably connected to the means for determining a turnable wheel angle $\beta_n$, when the turnable wheel angle $\beta_n$ exceeds a minimum threshold, indicating that the vehicle has the capacity to significantly move laterally warranting a signal;

d. evaluating an instantaneous lateral acceleration $A_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral acceleration $A_n$ of the vehicle is approximated by a trigonometric equation $$A_n = d(V_n \sin \beta_n)/dT;$$

e. activating the means for signaling, which is operably connected to the means for evaluating a lateral acceleration $A_n$ of the vehicle, after determining that the instantaneous lateral acceleration $A_n$ exceeds a minimum threshold, indicating that the vehicle is accelerating laterally at a rate which warrants a signal;

f. evaluating an instantaneous lateral velocity $L_n$ of the vehicle at time $T_n$ operably connected to the means for determining an instantaneous turnable wheel angle $\beta_n$ and the means for ascertaining an instantaneous forward speed $V_n$ of the vehicle, whereby the instantaneous lateral velocity $L_n$ of the vehicle is approximated by a trigonometric equation $$L_n = dD/dT = V_n \sin \beta_n;$$

g. activating the means for signaling, which is operably connected to the means for evaluating a lateral velocity $L_n$ of the vehicle, after determining that the instantaneous lateral velocity $L_n$ exceeds a minimum threshold, indicating that the vehicle is moving laterally at a rate which warrants a signal;

h. evaluating movement of a lateral distance $D_n$ of the vehicle over a period of time T operably connected to the means for determining an instantaneous turnable wheel angle $\beta_n$ and the means for ascertaining the instantaneous forward speed $V_n$ of the vehicle, whereby, the movement of a lateral distance $D_n$ of the vehicle is approximated by a trigonometric equation $$D_n = V \sin \beta_n \, dT; \text{ and}$$

i. activating the means of signaling, which is operably connected to the means for evaluating movement of a lateral distance $D_n$ of the vehicle, after the movement of a lateral distance $D_n$ exceeds a minimum threshold, indicating that the vehicle is moving laterally warranting a signal; and j. de-activating the means of signaling, when $\beta_n$ approaches zero degrees.

* * * * *